United States Patent Office 3,553,151
Patented Jan. 5, 1971

3,553,151
ISOMERIZATION CATALYST AND METHOD FOR PREPARING AND USING SAME
Joseph P. Giannetti, Allison Park, Alfred M. Henke, Springdale, and Raynor T. Sebulsky, Verona, Pa., assignors to Gulf Research & Development Company, Pittsburgh, Pa., a corporation of Delaware
No Drawing. Filed Mar. 4, 1968, Ser. No. 709,925
The portion of the term of the patent subsequent to Dec. 31, 1985, has been disclaimed
Int. Cl. B01j 11/78
U.S. Cl. 252—442
17 Claims

ABSTRACT OF THE DISCLOSURE

Low temperature isomerization catalyst compositions are prepared by treating a catalyst comprising alumina and a metalliferous material having hydrogenating activity with a bromide activating agent comprising a polybromide of a lower aliphatic hydrocarbon, carbonyl dibromide, dibromothione, an acetyl bromide, thionyl bromide, sulfur monobromide, a phosphorous bromide or a boron bromide.

---

This invention relates to the preparation of novel, low temperature isomerization catalyst compositions and to the use thereof for isomerization of relatively unbranched hydrocarbons to more highly branched forms.

In copending application Ser. No. 561,710, filed in the United States Patent Office on June 30, 1966, in the name of Joseph P. Giannetti et al., now U.S. Pat. No. 3,419,503, there is disclosed and claimed a method of activating composite catalytic materials comprising alumina and a metalliferous hydrogenating component by a treatment which includes activation with a carbon chloride having the general formula

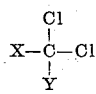

wherein X and Y may each be a monovalent radical of either hydrogen, halogen or SCl, or where X and Y taken together may be divalent oxygen or sulfur. Thus, carbon chlorides, such as carbon tetrachloride, chloroform, methylene chloride, dichlorodifluoromethane and the like are contemplated for such activation. In copending application Ser. No. 358,628, filed in the United States Patent Office on Apr. 9, 1964, in the name of William C. Starnes, now U.S. Patent No. 3,322,688, there is disclosed and claimed a method of activating such catalysts by treatment with a sulfur chloride, such as thionyl chloride, sulfuryl chloride, sulfur dichloride and sulfur monochloride.

It has now been found that composite catalytic materials comprising alumina and a metalliferous hydrogenating component may be activated by treatment with certain bromide activating agents selected from the group consisting of carbon bromides, phosphorous bromides, boron bromides and sulfur containing bromine compounds, with the contacting being conducted under nonreducing conditions sufficient to promote a substantial bromine content of the composite catalyst.

Surprisingly, it has been discovered that certain bromine-containing compounds can be employed in the production of highly active low temperature isomerization catalysts that are capable of effecting a high degree of conversion of isomerizable hydrocarbon feed stocks with excellent selectivities to the desired more highly branched products. The activity of the catalysts of the present invention is sufficiently high to permit operation of the isomerization process at low temperatures where the isomerization reaction is most favorable.

It has been further discovered that the activity of such catalysts can be still further enhanced by pretreating or post-treating the catalyst with hydrogen chloride prior to or after the bromine compound activation, respectively. It has further been found that the activity of such catalysts can be still further enhanced by subjecting the pretreated, activated catalyst to a post-treatment with hydrogen chloride.

In accordance with the present invention, a composite catalytic material comprising a major proportion of alumina and containing a minor proportion of a metalliferous material having hydrogenating activity, such as platinum metal, is activated for the isomerization of hydrocarbons by contacting the catalytic material under nonreducing conditions with a suitable bromine containing compound. The bromine containing compounds which are suitable include the bromine containing sulfur compounds, such as sulfur monobromide ($S_2Br_2$) and thionyl bromide ($SOBr_2$); phosphorous bromides, such as phosphorous tribromide ($PBr_3$) and phosphorous pentabromide ($PBr_5$); boron bromides, such as boron tribromide ($BBr_3$); mono-carbon polybromides, such as carbon tetrabromide, bromoform, methylene bromide, carbonyl dibromide ($COBr_2$), dibromothione ($CSBr_2$), etc.. di-carbon polybromides having at least two bromine atoms on one carbon atom such as ethylidene dibromide ($CH_3CHBr_2$), ethenyl tribromide ($CH_3CBr_3$), ethenylidene tribromide ($CHBr_2CH_2Br$), acetylene tetrabromide ($CHBr_2CHBr_2$), tetrabromoethane ($CBr_3CH_2Br$), pentabromoethane ($CBr_3CHBr_2$), hexabromoethane ($CBr_3CBr_3$), etc.; and acetyl bromides such as acetyl bromide ($CH_3COBr$), bromoacetyl bromide ($CH_2BrCOBr$)

dibromoacetyl bromide ($CHBr_2COBr$) and tribromoacetyl bromide ($CBr_3COBr$). Elevated temperatures sufficient to promote a substantial bromine content of the catalyst are necessary. For example, temperatures in the range of between about 200° and about 1100° F., preferably between about 600° and about 1000° F., are suitable for activating the catalysts of the present invention.

The bromine-activation treatment of the catalyst base is carried out under nonreducing conditions effective to promote a substantial bromine content of the catalyst base. The use of nonreducing conditions is important as reducing conditions may lead to formation of hydrogen bromide, which in turn will reduce the effective amount of bromine available to combine with the catalyst base. The nonreducing conditions can be achieved merely by the exclusion of materials other than the catalyst base and the bromide activating agent from the reaction zone. Alternatively, the bromide can be contacted with the catalyst base, together with an inert carrier gas such as nitrogen, or with an oxidizing gas such as air or oxygen. Likewise, the catalyst may be contacted with an inert carrier gas subsequent to the bromide activation.

By "nonreducing conditions" is meant merely essentially nonreducing conditions. Accordingly, conditions under which a small proportion of a reducing component such as hydrogen is present are not intended to be excluded.

The catalyst base may be contacted with the bromine activating agent in any proportions and under any conditions sufficient to produce a significant bromine content of the catalyst base. Proportions sufficient to provide a bromine content of the catalyst base of about one percent under the reaction conditions employed will produce an appreciable improvement in the activity of the catalyst, but it is preferred to utilize larger proportions sufficient to provide a bromine content of the catalyst of at least about 1.5 and preferably up to about 12 percent by weight. However, still larger proportions can be used: for example, there can be used amounts sufficient to yield up to about 20 percent bromine in the catalyst base without undue difficulties. Within the limits indicated, the use of the bromine compound in weight ratios of from about 0.01 to about 2.0, and preferably from about 0.05 to about 1 with respect to the catalyst base, are effective at the conditions disclosed herein to achieve the desired results.

The bromine activating agent interacts with the catalyst base most readily at elevated temperatures. Very active catalysts are obtained when using treating temperatures in the range of from about 600° to about 1050° F., but higher or lower temperatures can be used. For example, temperatures as low as about 200° F. are effective to promote the desired interaction. The treating temperature should not exceed about 1100° F. to avoid unnecessarily reducing the amount of bromine combined with the catalyst base. Within the temperature ranges disclosed, contact times of from about five minutes to about five hours, preferably from about 0.5 to about three hours, are effective to increase the bromine content of the catalyst base to a satisfactory level for purposes of this invention.

It is believed that the bromine portion of the bromide activating compound interacts chemically with the catalyst base in some not fully understood way. Available evidence indicates that the nature of the reaction is unique, as catalysts prepared in the manner disclosed herein are markedly superior to comparable catalysts in which the bromine content of the catalyst is increased, for example, by treatment with vaporous aluminum bromide.

Composite catalytic materials that have been activated in the manner indicated above are highly effective as low temperature isomerization catalysts for paraffinic hydrocarbons, but especially advantageous results may be obtained when the activating treatment is either preceded, followed or preferably both preceded and followed by an activating treatment with hydrogen chloride.

The hydrogen chloride pretreatment of the composite catalytic material may be carried out under any conditions which are effective to remove at least a portion of the water not previously removed during calcining and drying of the composite catalytic material and that will not adversely affect the catalytic activity of the catalyst by fusion. Temperatures in the range of from about 900° to 1250° F., preferably from about 950° to about 1100° F. are normally effective for this purpose. Temperatures significantly less than about 900° F. should not be used for purposes of the present invention, since such lower temperatures are relatively less effective to enhance the susceptibility of the catalyst base activation with the bromide compounds. The water which is removed during the pretreatment can be physically adsorbed water, chemically or pseudochemically bound water, such as water of hydration or water formed by the reaction of hydroxyl group present on the surface of the alumina.

The hydrogen chloride employed in the pretreating step may be used in any proportion with respect to the composite catalytic material that is effective to increase the chloride content of such material, as even a small increase in the chlorine content of such material obtained in this fashion will effectively increase the isomerization catalytic activity obtainable by the subsequent treatment with the bromide activation agent.

It is preferred to employ hydrogen chloride in substantial excess of the amount that is capable of combining with the composite catalytic material at the reaction conditions employed. Excellent results are obtainable by the use of hydrogen chloride in proportions of from about 0.1 to about 1:1 by weight with respect to the catalyst, but larger or smaller proportions can also be used with good results. The action of the hydrogen chloride upon the composite catalytic material takes place easily at atmospheric pressures, and elevated pressures are not necessary, although such pressures may be used if desired.

The hydrogen chloride pretreatment described above, can be carried out for as little as a few minutes, since some hydrogen chloride can combine with the catalyst even when only a small amount of water is removed from the composite catalytic material, but it is preferred to continue the hydrogen chloride treatment until no further evolution of water can be observed and until no further combination of hydrogen chloride with the catalyst is obtained at the reaction conditions selected. Normally this point will have been reached before about three hours at the temperatures indicated, and no further advantage is obtained by longer periods of the hydrogen chloride treatment, although the pretreatment has been successfully carried out for as long as six hours.

The hydrogen chloride utilized in the pretreating operation need not be pure and may contain other materials that do not adversely affect the isomerization activity of the finished catalyst. In fact, it is preferred to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but may be introduced in the form of a hydrogen chloride precursor, such as propyl chloride, t-butyl chloride or other chlorine-substituted aliphatic hydrocarbon, when hydrogen is used as the diluent gas.

The hydrogen chloride aftertreatment may be carried out at any conditions that will not significantly reduce the bromine content of the previously activated catalyst. Temperatures in the range of from about 60° to about 900° F., can be used. While some effect of the hydrogen chloride aftertreatment may be noted at temperatures below about 60° F., the temperature of the hydrogen chloride aftertreatment should not be significantly above about 900° F.

It is preferred to employ the hydrogen chloride in excess of the amount that will combine with the activated catalyst at the conditions of treatment, but smaller amounts can be used. By way of illustration, excellent results are obtainable by the use of hydrogen chloride in proportions of about 0.05 to 1:1 by weight with respect to the activated catalyst.

Similarly, as in the case of the hydrogen chloride pretreatment, the hydrogen chloride aftertreatment can be carried out at ambient atmospheric pressures, and elevated pressures are not necessary, although such pressures can be used. Also as in the case of the hydrogen chloride pretreatment, the contact with hydrogen chloride can be effected over a period of a few minutes to several hours with good results. If desired, the hydrogen chloride aftertreatment can be carried out before or during contact of the catalyst with a hydrocarbon feed to be isomerized. No significant additional advantages are observed from carrying out the hydrogen chloride aftertreatment beyond three hours, although longer treating periods can be used successfully.

Further, as in the case of the hydrogen chloride pretreatment, the hydrogen chloride need not be pure and may contain as a diluent in any proportion hydrogen gas or inert diluent gases such as nitrogen and the like. By way of illustration, good results are obtainable when hydrogen is employed in proportions of from about 1:1 to about 10:1 by volume with respect to the hydrogen chloride.

The composite catalysts from which the activated catalysts of this invention are derived can comprise any form of porous alumina suitable for use as a catalytic agent or support. For example, excellent results are obtainable with aluminas prepared by calcining a beta-alumina trihydrate such as bayerite or mixtures thereof with other alumina hydrates, but aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha- and beta-alumina monohydrate such as boehmite and diaspore, or various combination of any of these can be used. Also there can be used the aluminas described in U.S. Pats. Nos. 3,151,-939, 3,151,940, and 3,188,174 in the names of William L. Kehl and Meredith M. Stewart, which aluminas are prepared by calcining an alumina hydrate containing 1.2 to 2.6 mols of water of hydration.

The alumina bases useful in the present invention can be essentially pure alumina as is preferred, or they can contain small amounts, up to about 45 percent of other refractory oxides, such as silica, veryllia, titania, zirconia or boria. Such aluminas are generally characterized by a high surface area, commonly ranging from about 200 to 500 m.$^2$/g. or even more.

Especially advantageous results are obtainable when using aluminas having a surface area above about 250 m.$^2$/g. and more particularly, above 300 m.$^2$/g., although aluminas of lower surface area can be used. Presumably, the amount of bromine that can be taken up during the bromide activation treatment is a function of the surface area that can be contacted thereby, although available experimental evidence indicates that the amount of bromine taken up is not necessarily limited by surface area.

The catalyst bases or precursors from which the activated catalysts of this invention are prepared are composited with a small proportion of at least one metalliferous component, having hydrogenating activity and selected from Group VI–B or from Group VIII of the Periodic Table, as disclosed on page 392 of the Handbook of Chemistry and Physics, 36th edition, Chemical Rubber Publishing Co. Examples of suitable materials are platinum, rhodium, palladium, nickel and tungsten. Especially good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 and 0.7 percent platinum or one percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added as a salt to the alumina hydrate and then precipitated with a substance such as hydrogen sulfide and calcining, or calcining alone. Additionally, an aqueous metal sulfide sol, for example a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to the pretreatment with hydrogen chloride or the activation treatment with the bromine compound, so as to minimize loss of the hydrogenating component by formation of volatile complexes during the bromine activation treatment. In the case of base metals such as nickel and tungsten, the hydrogenating component can remain in the form of a sulfide or oxide prior to the hydrogen chloride pretreatment and the bromide activation treatment.

It is also important that the hydrogenating component be composited with the alumina base before the hydrogen chloride pretreatment and the bromide activation treatment, as deposition thereafter normally will result in a reduction of the bromine content of the bromide treated base. This is undesirable, as the activity of the herein-disclosed catalyst appears to be generally related to the increase in bromine content attributable to the activation treatment.

The catalyst base may contain halogen other than that incorporated by the bromide activation treatment. For example, some halogen content may result from the use of an aluminum halide as a starting material to form the alumina base and/or some halogen may remain in the catalyst owing to the use of a halogen-noble metal acid. However, the halogen content from such sources as these does not appear to be equivalent, for purposes of this invention, to the halogen content resulting from the bromide activation treatment.

Catalysts that have been activated by the activating processes described herein are useful in the low temperature isomerization of isomerizable saturated hydrocarbons, including not only straight-chain and slightly branched paraffins containing four to seven carbon atoms such as n-butane, n-pentane and n-hexane, etc., but also cycloparaffins such as methyl- and ethyl-substituted cyclopentanes. In this reaction the cyclopentane ring is isomerized to the cyclohexane ring. These compounds need not be pure but can be mixed with other hydrocarbon materials as in the case of fractions obtained by fractional distillation of gasoline and naphtha cuts obtained from crude oils or reforming, for example. The process is especially advantageous for vapor phase isomerization of straight chain paraffin hydrocarbons containing four to seven carbon atoms.

When the isomerization feed stock is derived from crude oil, the sulfur content may be so high as to affect the catalyst detrimentally. In such instances, it may be desirable to desulfurize the feed prior to isomerization in conventional manner, preferably by treatment with a suitable desulfurizing catalyst in the presence of hydrogen at elevated temperature and pressure. Desulfurization is especially important when the hydrogenating metal component of the herein-disclosed catalysts is sensitive to sulfur, as in the case of platinum.

Isomerization of the herein-disclosed feed stocks with the herein-disclosed catalysts is carried out at low temperatures in the range of from about 150° to about 450° F. preferably in the presence of hydrogen gas at a pressure of from about atmospheric to about 2000 p.s.i.g., preferably from about 50 to about 1200 p.s.i.g., using a hydrogen:hydrocarbon mol ratio in the range of from about 0 to about 10:1, preferably from about 0.1 to about 5:1. Space velocities of from about 0.3 to about 10 and preferably from about 0.5 to about 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product.

The invention may be best understood by reference to the folowing specific examples which are illustrative only and are not intended to be limiting as to scope. All of the percentages indicated are by weight, unless otherwise specified.

EXAMPLE 1

A commercial naphtha reforming catalyst in the amount of about 123.5 grams containing 0.6 percent platinum on an alumina base, having a typical chlorine content of 0.6 percent chlorine and a typical surface area of about 425 m.$^2$/g. is calcined at 550° F. overnight and at 900° F. for two hours. This catalyst is reduced in a stream of hydrogen at 900° F. for two hours. The hydrogen flow rate utilized is 1.5 standard cubic feet per hour. The reduced catalyst is purged over a period of six hours in a flow of prepurified nitrogen.

The temperature of the catalyst is then lowered to 800° F. and the catalyst is subjected to a concurrent pretreatment with nitrogen at a flow rate of 0.57 standard cubic feet per hour and with 155 grams of bromoform (CHBr$_3$) over a period of one hour. The resulting catalyst contains about 14.7 precent bromine.

EXAMPLE 2

The catalyst prepared by the method of Example 1 is tested for the conversion of normal hexane by charging 500 milliliters of a normal hexane feed stock and 125 milliliters of the catalyst to a stirred autoclave. The system is placed under 300 p.s.i.g. hydrogen pressure and the temperature is brought to 275° F. over a three hour period, and maintained at 275° F. for four hours.

At the end of this four hour period analysis of the product indicates that 53 percent by weight of the normal hexane is converted to branched isomers with essentially 100 percent selectively to C$_6$ products.

The following example illustrates the inactivity of the reduced catalyst when the activation step of the present invention is omitted.

EXAMPLE 3

A reduced catalyst prepared by the method of Example 1, except that the bromoform activation is omitted, is placed in the autoclave together with n-hexane. The same conditions are employed as in the previous example.

A product analysis indicates that there is no conversion of normal hexane to branched isomers.

EXAMPLE 4

One hundred twenty grams of a commercial naphtha reforming catalyst similar to that of Example 1 is calcined, reduced and purged in the manner described in Example 1. The temperature of the catalyst is brought to 800° F. in a stream of nitrogen gas, and 120 grams of thionyl bromide (SOBr$_2$) are passed over the catalyst in one and one-half hours with the nitrogen carrier gas. The nitrogen is employed at a flow rate of 0.60 standard cubic feet per hour.

At the conclusion of the bromide addition, the temperature is maintained at 800° F. for an additional two hour period. The resulting catalyst contains about 12.5 percent bromine.

EXAMPLE 5

One hundred twenty five grams of the catalyst prepared according to the procedure of Example 4 and 500 milliliters of normal hexane are charged to a stirred autoclave. A hydrogen pressure of 300 p.s.i.g. is placed on the autoclave and the temperature is brought to 275° F. over a two hour period while stirring.

After about four hours at a temperature of 275° F., the contents of the autoclave is analyzed. The analysis indicates a 23 percent conversion of the normal hexane to branched isomers.

The next three examples illustrate the effect of a hydrogen chloride pretreatment step.

EXAMPLE 6

A reduced platinum on alumina catalyst is prepared by the procedure of Example 1. The temperature of the catalyst is then raised to 1050° F. and a mixture of hydrogen and hydrogen chloride comprising 15 grams of hydrogen chloride per hour and 1.5 standard cubic feet of hydrogen per hour is passed over the reduced catalyst for a period of three hours.

The temperature of the catalyst is then reduced to 800° F. and 155 grams of bromoform (CHBr$_3$) are passed over the catalyst for a period of one hour with a flow of 0.57 standard cubic feet per hour of nitrogen. At the conclusion of the bromoform addition, the temperature is held at 800° F. for an additional two hours.

EXAMPLE 7

The catalyst prepared by the method of Example 6 is tested for the conversion of normal hexane by charging 500 millitiliters of a normal hexane feed stock along with 125 milliliters of the catalyst of Example 6 to a stirred autoclave. The system is placed under 300 p.s.i.g. hydrogen pressure and the temperature is brought to 275° F. over a three hour period and maintained at 275° F. for four hours. An analysis of the product after this four hours period indicates that 66 percent of the normal hexane is converted to branched isomers.

Thus, the pretreatment of the bromoform-activated catalyst with hydrogen and hydrogen chloride as in Example 6 resulted in a catalyst that is 25 percent more active than the bromoform-activated catalyst prepared according to the procedure of Example 1 wherein no hydrogen chloride pretreatment is employed.

EXAMPLE 8

The thionyl bromide activation procedure of Example 4 is repeated with the exception that the reduced platinum on alumina catalyst is subjected to a pretreatment with hydrogen and hydrogen chloride at a temperature of 1050° F. employing 15 grams per hour hydrogen chloride at a temperature of 1050° F. employing 15 grams per hour hydrogen chloride and 1.5 standard cubic feet of hydrogen per hour for a period of three hours.

This catalyst is tested for the conversion of n-hexane by charging 500 milliliters of n-hexane and 125 grams of the catalyst to a stirred autoclave. The system is placed under 300 p.s.i.g. hydrogen pressure and the temperature is brought to 275° F. over a three hour period, and maintained at 275° F. for four hours. At the end of the four hour period 30 percent of the n-hexane is converted to branched isomers.

The next two examples illustrate the effect of a hydrogen chloride pretreatment and post-treatment in the product of the catalysts of the present invention.

EXAMPLE 9

A reduced platinum on alumina catalyst is pretreated with hydrogen chloride and activated with bromoform in the manner described in Example 6. However, the hydrogen chloride-pretreated, bromoform-activated catalyst is then cooled in a flowing stream of nitrogen to 400° F. At this temperature the flow of nitrogen is discontinued and the activated catalyst is subjected to an after-treatment with hydrogen chloride. This treatment is effected by passing 15 grams per hour of hydrogen chloride over the catalyst for a period of three hours. Finally the catalyst is cooled in a flowing stream of nitrogen to room temperature.

EXAMPLE 10

The catalyst of Example 9 is employed for the conversion of normal hexane under 300 p.s.i.g. pressure and 275° F. in a stirred autoclave as in Example 7. A conversion of about 70 percent results after about four hours at 275° F. indicating that the hydrogen chloride after-treatment is effective to further increase the activity of the hydrogen chloride-pretreated, bromoform-activated catalyst.

EXAMPLE 11

In separate runs, equivalent amounts of carbon tetrabromide, methylene bromide, sulfur monobromide, carbonyl dibromide, ethylidene dibromide, ethenyl tribromide, acetylene tetrabromide, acetyl bromide, tribromoacetyl bromide, phosphorous tribromide, and boron tribromide are employed for the activation of a reduced platinum on alumina catalyst. The conditions employed are effective to result in a substantial amount of bromine being imparted to the reduced catalyst. When tested in the convension of normal hexane at the relatively low temperature of 275° F., while under a hydrogen pressure of 300 p.s.i.g., a substantial conversion of the hexane to its isomers results in each case.

Obviously, many modifications and variations of the invention as hereinabove set forth can be made without departing from the spirit and scope thereof, and therefore only such limitations should be imposed as are indicated in the appended claims.

We claim:

1. The method of activating a composite catalyst consisting essentially of a metalliferous material having hydrogenating activity and being selected from Group VI-B and Group VIII metals on an alumina base, comprising contacting said composite catalyst with hydrogen chloride at a temperature in the range of from about 900° F. to about 1250° F. and then contacting with a bromine activating agent selected from the group consisting of a polybromide of a lower aliphatic hydrocarbon, carbonyl dibromide, dibromothione, thionyl bromide, sulfur monobromide, phosphorus bromides, boron bromides and acetyl bromides, said contacting being carried out under nonreducing conditions at a temperature in the range of between about 200° and about 1100° F.

2. The method of claim 1 wherein the bromine activating agent is selected from the group consisting of carbon tetrabromide, bromoform, methylene bromide, carbonyl dibromide and dibromothione.

3. The method of claim 2 wherein the bromine activating agent is bromoform.

4. The method of claim 1 wherein the bromine activating agent is selected from the group consisting of ethylidene dibromide, ethenyl tribromide, ethenylidene tribromide, acetylene tetrabromide, tetrabromoethane, pentabromoethane, hexabromoethane, acetyl bromide, bromoacetyl bromide, dibromoacetyl bromide and tribromoacetyl bromide.

5. The method of claim 1 wherein the metalliferous material is platinum in reduced form.

6. The method of claim 1 wherein the bromine-activated catalyst is subjected to a hydrogen chloride post-treatment comprising contacting the bromine-activated catalyst with hydrogen chloride at a temperature in the range of from about 60° F. to about 900° F.

7. A low temperature isomerization catalyst consisting essentially of a metalliferous material having hydrogenating activity and being selected from Group VI-B and Group VIII metals on an alumina base, which has been prepared by the process of claim 6.

8. The method of claim 1 wherein the alumina has a surface area of more than about 250 square meters per gram.

9. A low temperature isomerization catalyst consisting essentially of a metalliferous material having hydrogenating activity and being selected from Group VI-B and Group VIII metals on an alumina base, which has been prepared by the process of claim 1.

10. The method of activating a compositive catalyst consisting essentially of a metalliferous material having hydrogenating activity and being selected from Group VI-B and Group VIII metal on an alumina base, comprising contacting said composite material with a bromine activating agent selected from the group consisting of carbonyl dibromide, dibromothione, acetyl bromides, thionyl bromide and sulfur monobromide, said contacting being carried out under nonreducing conditions at a temperature in the range of between about 200° and about 1100° F.

11. The method of claim 10 wherein the bromine-activated catalyst is subjected to a hydrogen chloride pretreatment comprising contacting said composite catalyst with hydrogen chloride at a temperature in the range of from about 900° F. to about 1250° F.

12. The method of claim 10 wherein the composite catalyst is subjected to contact with hydrogen chloride at a temperature in the range of about 900° F. to about 1250° F. prior to being contacted with said bromine activating agent, and wherein the bromine-activated catalyst is contacted with hydrogen chloride at a temperature in the range of about 60° F. to about 900° F.

13. The method of claim 12 wherein the hydrogen chloride used for contacting the bromide-activated catalyst is supplied with a hydrogen isomerization feed stock.

14. The method of claim 10 wherein the metalliferous material is platinum in reduced form.

15. The method of claim 10 wherein the bromine-activated catalyst is post-treated by contacting with hydrogen chloride at a temperature in the range of from about 60° F. to about 900° F.

16. The method of claim 10 wherein the alumina has a surface area of more than about 250 square meters per gram.

17. The method of claim 15 wherein the hydrogen chloride for the post-treatment is supplied with a hydrocarbon isomerization feed stock.

References Cited
UNITED STATES PATENTS

| | | | |
|---|---|---|---|
| 3,227,658 | 1/1966 | Myers et al. | 252—442X |
| 3,242,228 | 3/1966 | Riordan et al. | 252—441X |
| 3,253,055 | 5/1966 | Goble et al. | 260—683.68X |
| 3,322,688 | 5/1967 | Starnes | 252—441X |
| 3,330,779 | 7/1967 | Giannetti et al. | 252—441 |
| 3,419,503 | 12/1968 | Giannetti et al. | 252—441 |
| 3,440,301 | 4/1969 | Lafferty et al. | 252—442X |
| 3,449,264 | 6/1969 | Myers | 252—442X |

PATRICK P. GARVIN, Primary Examiner

U.S. Cl. X.R.

252—441; 260—683.68, 683.75